March 6, 1956
C. R. DOTY
2,737,241
AUTOMATIC ZEROS PUNCHING DEVICE UNDER
KEY AND PROGRAM CARD CONTROL
Filed Oct. 17, 1952
6 Sheets-Sheet 1
FIG.1
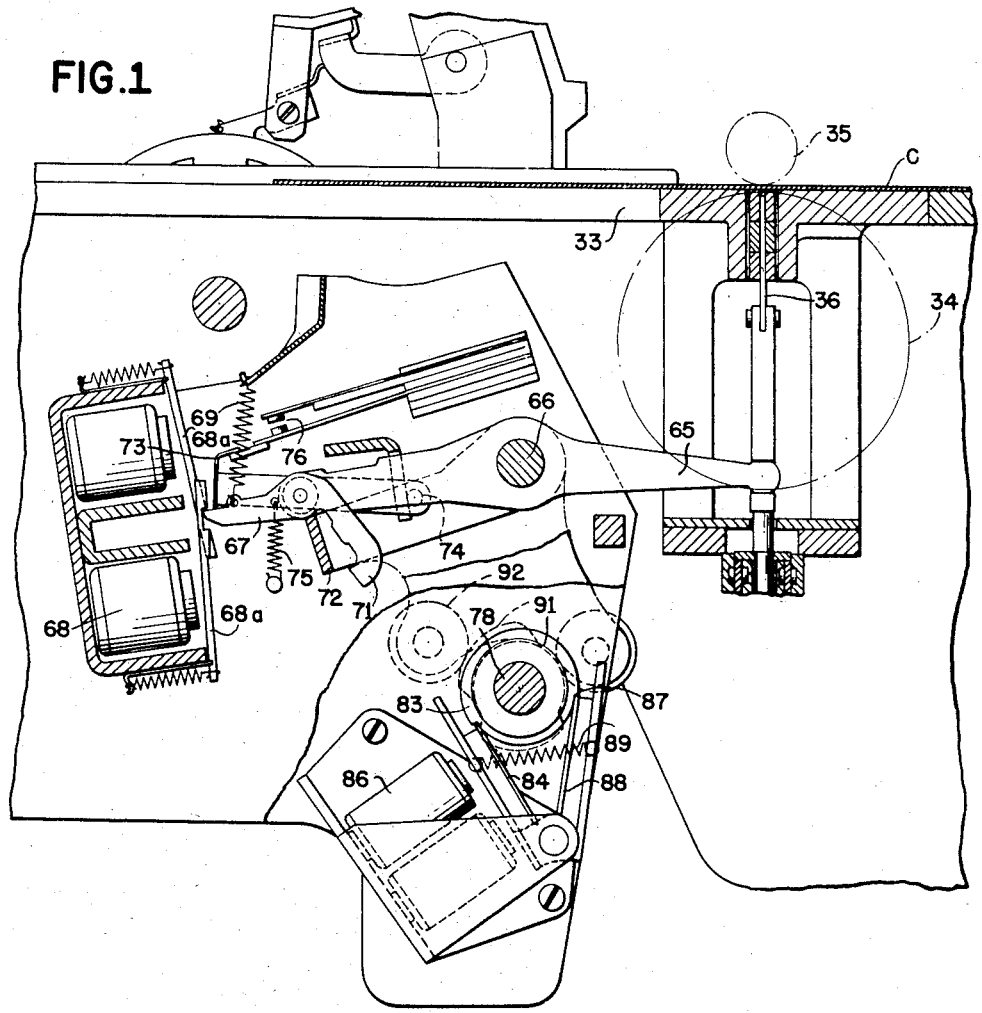
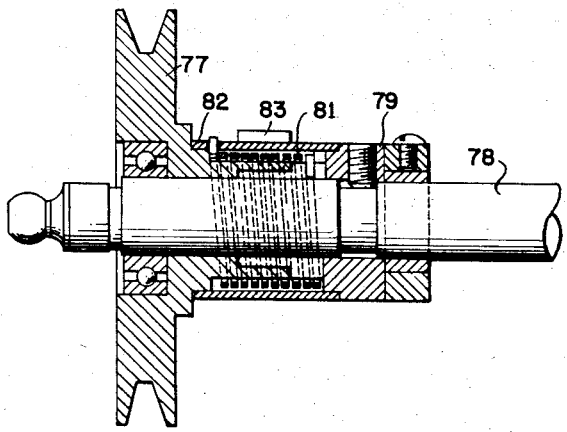
FIG.2
INVENTOR
CHARLES R. DOTY
BY Harry T. Borriman
AGENT March 6, 1956
C. R. DOTY
2,737,241
AUTOMATIC ZEROS PUNCHING DEVICE UNDER
KEY AND PROGRAM CARD CONTROL
Filed Oct. 17, 1952
6 Sheets-Sheet 2
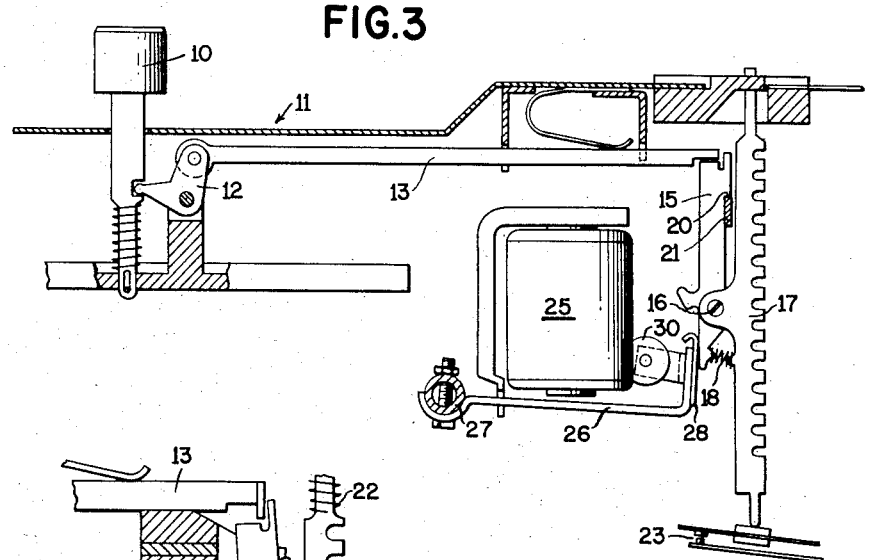
FIG.3
FIG.3a
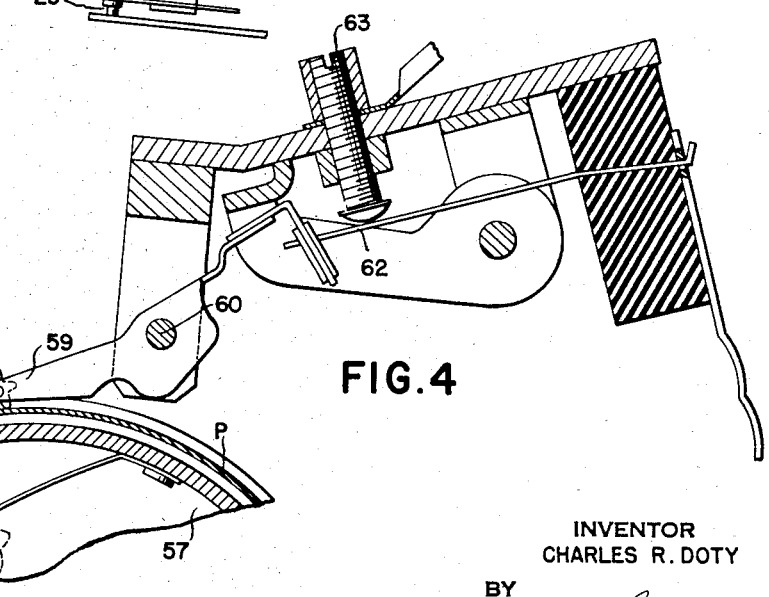
FIG.4
INVENTOR
CHARLES R. DOTY
BY
*Harry T. Berriman*
AGENT March 6, 1956

C. R. DOTY 2,737,241

AUTOMATIC ZEROS PUNCHING DEVICE UNDER
KEY AND PROGRAM CARD CONTROL

Filed Oct. 17, 1952

INVENTOR
CHARLES R. DOTY

BY
Harry T. Berriman
AGENT

March 6, 1956

C. R. DOTY 2,737,241

AUTOMATIC ZEROS PUNCHING DEVICE UNDER
KEY AND PROGRAM CARD CONTROL

Filed Oct. 17, 1952

READING LINE

PUNCHING LINE

FIG.10

INVENTOR
CHARLES R. DOTY
BY
*Harry T. Berriman*
AGENT

United States Patent Office 2,737,241
Patented Mar. 6, 1956

2,737,241

AUTOMATIC ZEROS PUNCHING DEVICE UNDER KEY AND PROGRAM CARD CONTROL

Charles R. Doty, Poughkeepsie, N. Y., assignor to International Business Machines Corporation, New York, N. Y., a corporation of New York Application October 17, 1952, Serial No. 315,247

14 Claims. (Cl. 164—113)

This invention relates to record controlled perforating machines, and more particularly to perforating machines in which record cards are provided with columns of punching positions, and in which perforating takes place column by column under control of manually operable keys.

The principal object of the invention is to provide improved controls in a key-operated perforating machine to cause the machine to automatically "fill in" zeros to the left of the significant value. In the use of perforated cards, a so-called "field" comprising a plurality of columns is designated to receive entries varying in denominational size. For example, in a field of seven columns, amounts such as 764,321, 876, or, 5, may be punched. It is the practice in cases where the size of the number is less than the total number of columns in the field to "fill in" or punch zeros in the left hand columns, so that there is a designation in each column of the field. Thus, for a 7-column field, the above amounts would be punched as 0764321, 0000876 or 0000005.

In carrying out the object of the invention, the perforating machine is provided with a programming device coordinated with the record card advancing mechanism and the keyboard so that, when the first column of a field is in readiness to be punched, the operator will press the numerical key corresponding to the number of denominational places in the amount that is to be punched. The operation of such key will cause a number of zeros to be automatically punched in the field to provide the required number of "fill in" zeros. The operator thereafter depresses the keys in accordance with the amount to be entered, and such amount will be punched in the right hand columns of the field. Thus, for the number 764,321 in the examples mentioned above, operation of the 6 key will cause one zero to be punched. For the amount 876, operation of the 3 key will cause four zeros to be punched, and for the amount 5, operation of the 1 key will cause six zeros to be punched. These zeros are punched in rapid uninterrupted succession, bringing the first column that is to receive the amount punching into punching position.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a sectional view showing the essential elements of a well known form of record perforating machine.

Fig. 2 is a sectional detail of a one-revolution clutch.

Fig. 3 is a sectional view showing the essential elements of the keyboard mechanism.

Fig. 3a is a detail of parts in Fig. 3 shown in operated position.

Fig. 4 is a detail of the program card reading mechanism.

Figure 8:
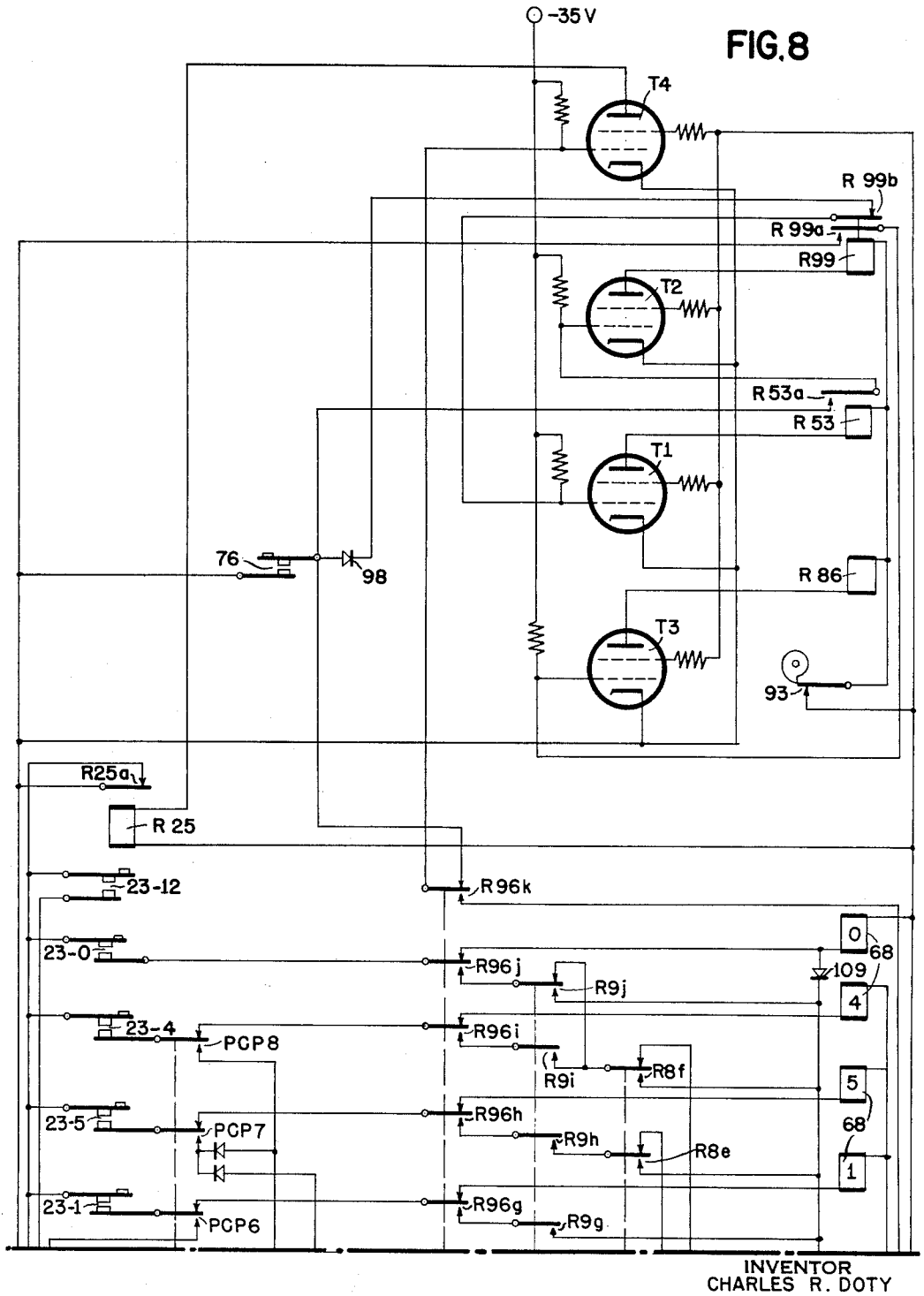
Figure 8A:
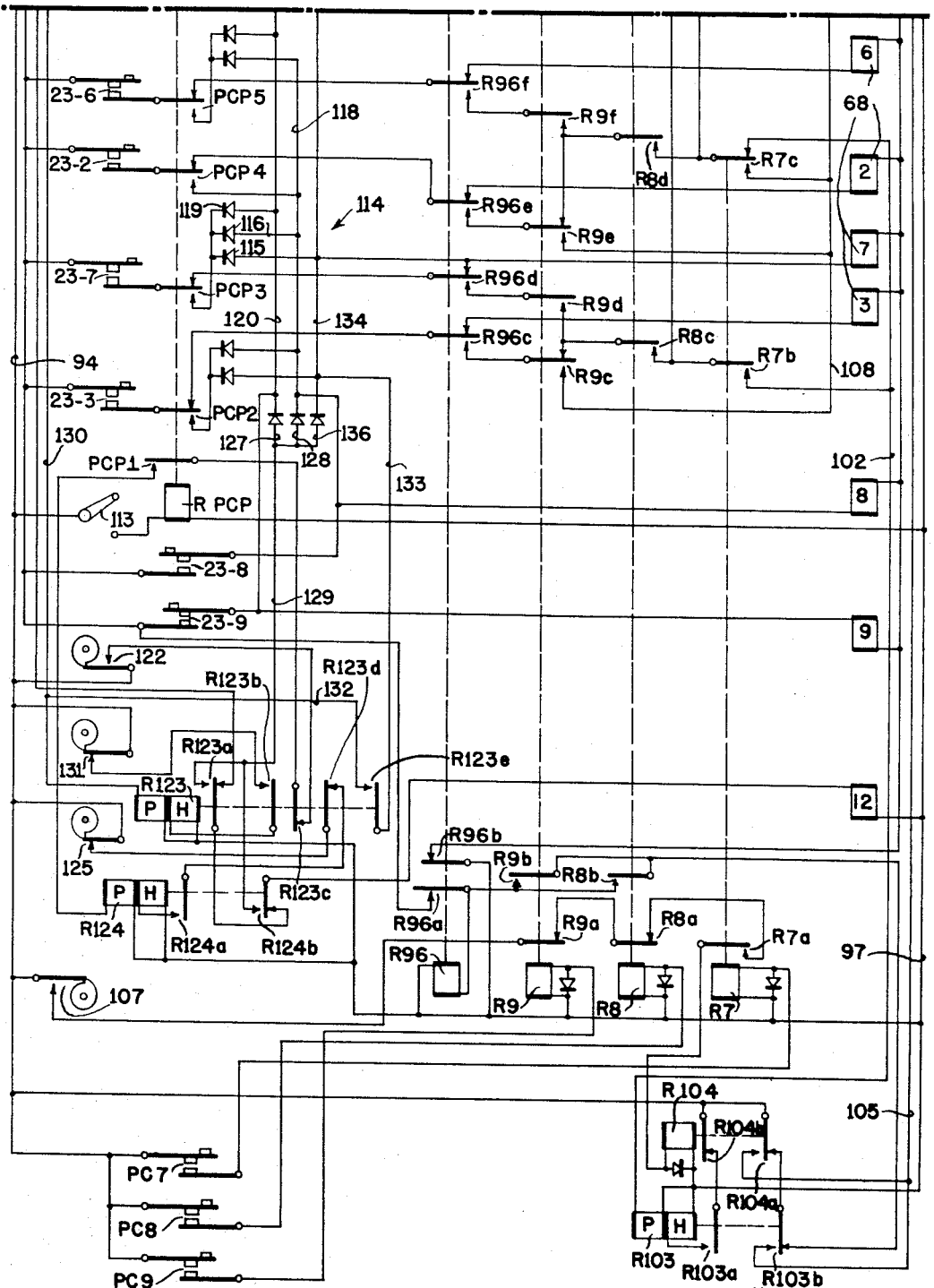

Figs. 8 and 8a taken together constitute a simplified circuit diagram showing the essential elements of the invention.

Fig. 9 is a view of the program card.

Fig. 10 is a view of a record card punched under control of the program card in Fig. 9.

The perforating machine to which the invention is applied is of a well-known type known as the IBM card punch, Model 026, which is shown and described in detail in Patent No. 2,647,581 granted August 4, 1953. In the present application only so much of the perforating machine is described as is necessary for an understanding of the invention.

Keyboard

Referring to Figs. 3 and 3a, the key 10, of which there is one provided for each of the digits, is mounted for vertical operation in the framework generally designated 11 and, through a bell crank 12, draws a link 13 toward the left. This link is pivoted to the bell crank on its left end, and its right end hooks into a notch in a member 15 which is pivoted at 16 to a vertical slide 17. The member 15 is normally biased clockwise about its pivot 16 by a spring 18 and has a shoulder 20 engaged on a bar 21 to hold it in the position shown in Fig. 3. When key 10 is depressed, link 13 is drawn toward the left carrying with it the upper end of a member 15, thereby disengaging its shoulder 20 from the bar 21. Thereupon, spring 22 encircling the upper end of slide 17 will force the slide downward to the position of Fig. 3a.

Beneath each of these slides 17 is a pair of contacts, generally designated 23, which, when the slide is released as explained, will be closed as shown in Fig. 3a. As stated, there is a key 10 for each of the digits and accordingly there are ten contacts 23 shown in Fig. 8 where they are designated as corresponding to the digits 0, 1, 2, 3, 4, 5, 6, 7, 8 and 9. The slide 17, when thus released, will remain in the position of Fig. 3a and its contacts will accordingly remain closed until the keyboard restoring magnet 25 is energized, whereupon its armature 26, pivoted at 27, will rock counterclockwise and move a bent plate 28 into engagement with the member 15, lifting it back into its latched position along with slide 17, where it will remain until the next key operation. The armature 26 carries an insulating disk 30 which, when magnet 25 is energized, causes the opening of a pair of contacts 25–1 (Fig. 8) for a purpose that will be later evident.

Card feeding mechanism

Figure 5:
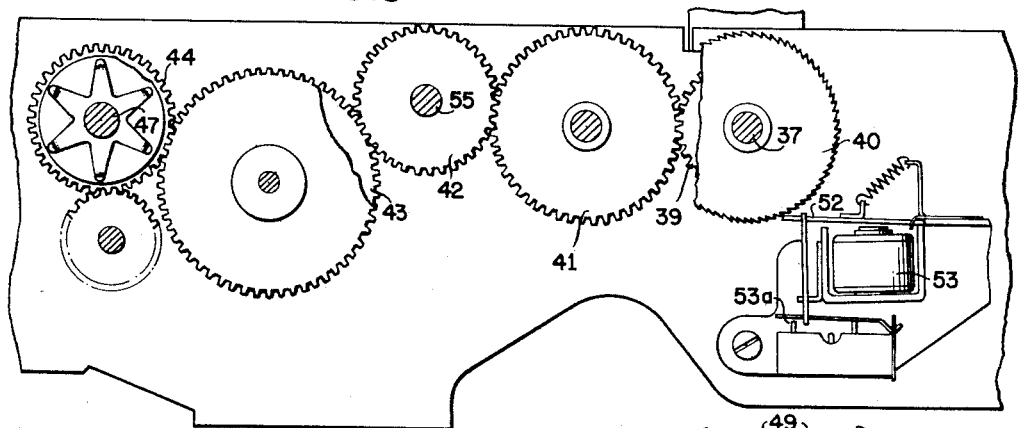
Fig. 5 is a view showing the card feed drive and escapement mechanism.
Figure 7:
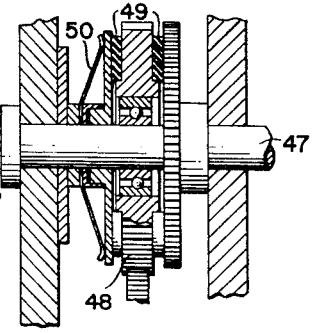
Fig. 7 is a detail section of the friction device forming part of the card feeding mechanism and is taken on the line 7—7 of Fig. 6.
Figure 6:
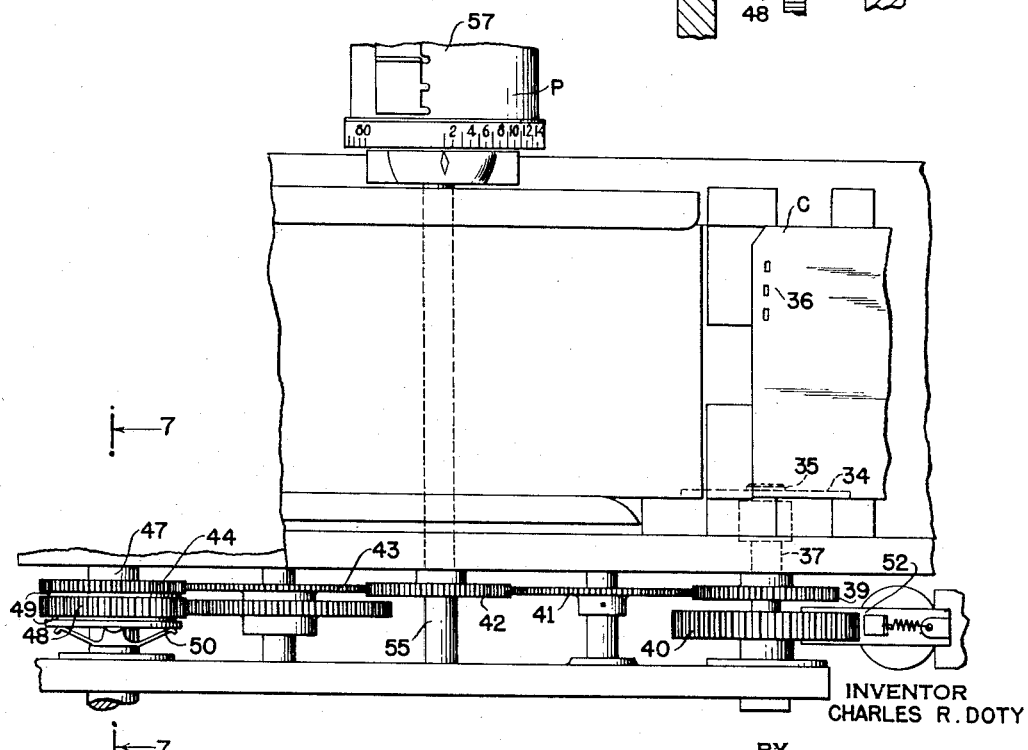
Fig. 6 is a plan view of the card feed driving mechanism.

Referring to Fig. 1, a record card C is guided for movement on plate 33 and advanced by a pair of feed rollers designated 34, 35 of which the latter is an idler, while the former is driven by mechanism about to be described, so as to move the card, column by column, past a row of punches 36 (see also Fig. 6). The feed roller 34 is secured to a shaft 37 (Figs. 5 and 6) to which there is also secured a gear 39 and escapement ratchet 40. The gear 39 is biased in a counterclockwise direction as viewed in Fig. 5 through a chain of gears designated 41, 42, 43 and 44. The last named gear is secured to a shaft 47 which, as shown in Fig. 7, has freely mounted thereon a gear 48. This gear is constantly driven from any suitable source and for the purposes of the present invention may be considered to be in constant rotation. On either side of gear 48 is a friction disk 49, and a spring device 50 constantly urges the friction disks 49 into driving engagement with gear 48.

Accordingly, through the chain of gearing traced, the gear 39 and the connected escapement ratchet 40 are constantly biased in a counterclockwise direction. They are restrained from moving, however, by the engagement of an armature pawl 52 with the teeth of ratchet 40. The escapement magnet 53, when momentarily energized, permits the ratchet to advance one tooth space so as to advance the card one column. Escapement magnet 53, when energized, closes a pair of contacts 53a which will be referred to later.

Program card drive

The gear 42 (Figs. 5 and 6) is secured to a shaft 55 carrying a drum 57 about which may be wrapped the programming card designated P. Since the gear 42 is in the friction driven chain and directly coupled to the escapement ratchet, the drum 57 rotates in steps to advance the program card, column by column, concurrently with the advance of the record card, so that the movement of the two cards is in unison. A sensing or reading device is provided for each digital position of the program card in the form of a star wheel 58 (Fig. 4) having five points. This is the well known sensing device disclosed in Patent 2,517,984, issued August 8, 1950, to J. M. Cunningham.

Normally, the star wheel occupies the position shown in Fig. 4 and, as the drum 57 rotates, the star wheel slides across the surface of the card while remaining in the position shown. The wheel is rotatably supported by a lever 59 carried on a rod 60 and biased counterclockwise through engagement of contact spring 62 with the right hand end of the lever. When a perforation in the program card arrives at the star wheel, the right hand tooth drops into the perforation causing lever 59 to rock counterclockwise and causing contact spring 62 to engage a stationary contact 63. These contacts are generally designated PC in Fig. 8, and each individual pair of contacts PC shown is further designated 7, 8, 9, etc., dependent upon which index or digital point position of the record its controlling star wheel mechanism is adapted to sense. Where successive columnar positions of the program card are perforated in the same index point position, the related star wheel 58 after having rocked into the first of such series of perforations to close the related contact PC, will thereafter roll from one perforation to the next without rocking the associated lever 59. Consequently, the associated contacts PC remain closed during the passage of such a series of perforations in the program card.

Punch mechanism

The punch mechanism, as shown in Fig. 1, is provided with the usual punches 36, and associated with each punch is an actuating lever 65 pivoted to a shaft 66 and carrying a spring pressed latch 67 which is normally engaged by an armature 68A of a punch interposer magnet 68 and held thereby in the position shown in Fig. 1. Upon energization of magnet 68, its armature 68A rocks to release latch 67 which thereupon, under the influence of its spring 69, rocks clockwise to move its hooked end 71 under a bail 72 which is pivoted about the shaft 66. The rocking of any of the twelve latches 67 causes a bail 73 to rock about its pivot 74 against the tension of spring 75 and close a pair of punch interposer contacts 76. These contacts bring into operation a clutch mechanism to cause an oscillation of bail 72 as hereinafter explained.

Referring to Fig. 2, a pulley 77 is freely rotatable on a shaft 78 (see also Fig. 1) and is in constant rotation from a suitable driving source. Secured to the shaft 78 is a stop cam 79, and extending between pulley 77 and the stop cam is a spring 81 coiled about and spaced from the extended hub of pulley 77. One end of this spring is fastened to the stop cam, and the other end is fastened to a sleeve 82. The sleeve is provided with a stop 83 which engages armature 84 of a magnet 86, while cam 79 has a stopping edge 87 engaging a pivoted lever 88 which is urged toward the armature 84 by a connecting spring 89. The parts just described constitute a well-known form of one-revolution clutch and, with the parts in normal position and with both stops 83 and 87 engaging their respective levers, the spring 81 is held in a slightly open position, so that the hub of pulley 77 may rotate freely within the spring.

Upon energization of magnet 86, armature 84 releases stop 83, whereupon spring 81 rocks the sleeve 82 until the spring closes enough to grip the hub of the pulley and is driven thereby to effect a driving of the shaft 78 through the stop cam 79. At the completion of a revolution, with magnet 73 deenergized, the rotational motion of the sleeve 82 is interrupted by the armature 84 to reopen the spring 81 and effect uncoupling of the parts. The driven parts are overthrown slightly so that stop 87 reengages lever 88, preventing reclosure of the coil spring. The shaft 78 carries a pair of complementary cams 91 which drive rollers 92 mounted on a side arm of bail 72 so that the bail is oscillated once for each revolution of shaft 78. The shaft 78 also carries a cam (not shown) for operating a pair of contacts designated 93 as shown in the circuit diagram (Fig. 8).

The foregoing describes briefly the operation of the elements of the well-known punching machine necessary for an understanding of the present invention, and further details of construction and operation of such prior art mechanism may be found in the patents referred to hereinabove.

The record card

In Fig. 10 is shown a record card C in which perforations are indicated in several fields, each comprising multiple columns. For those fields in which it is desired to fill in zeros to the left of the amount, the program card P of Fig. 9 is perforated in its 7, 8 and 9 index positions as shown. For the purposes of the present invention, it is assumed that a maximum field extent is seven columns, so that the program card will have 7 punched in each units or right hand column; 8 in the tens; 7, 8 in the hundreds; 9 in the thousands; 7, 9 in the tens of thousands; 8, 9 in the hundreds of thousands; and 7, 8, 9 in the millions columns. It will also be noted in Fig. 9 that each column, except the highest order column of a field, also contains a 12 perforation. These 12 perforations are of no interest in the subject operation, but they are required for conventional duplication and skipping operations performed by the punch. A complete explanation of these operations may be obtained, if desired, by reference to the previously mentioned patent. The manner in which the 7, 8, 9 index point perforations in the program card effect control of zero punching in the record card C will be explained in connection with the circuit diagram.

In Figs. 9 and 10, the rows designated "reading line" and "punching line," respectively, serve to indicate that there is a 1-column displacement between the two cards with respect to their reading and punching line so that, when any column of the program card is at its reading line, the corresponding column of the record card is one space or column away from its punching position.

Circuit diagram

The operation of the machine may best be followed by tracing specific circuits in accordance with the examples shown in Figs. 9 and 10. Assume that the program card has been placed on the program drum and positioned with column 1 in line with the star wheels 48 and that the record card has been suitably introduced into the machine and placed between its feed rollers 34 and 35 with its column 1 one space or step to the right of the line of punches 36. The card may then be advanced through the usual spacing devices (not shown) to bring column 2 into line with the punches. The apparatus is now in readiness to punch the value 2 in column 3.

Operation of the 2 key (10), Fig. 3, will close the associated 23-2 contacts (Fig. 8a) to complete a circuit from a zero potential power line 94 through the keyboard restore contacts 25a, 23-2 contacts, the normally closed side of contacts PCP-4 of a relay designated PCP, the normally closed side of contacts 96e of a relay R96, the 2 interposer magnet 68 and the normally closed side of contacts 96b of relay R96 to a positive potential power line 97. This operation of the 2 key, as explained in connection with Figs. 3 and 4, releases the related slide 17 to close the contacts 23-2 which remain closed until the restoring magnet 25 is energized. The energization of the magnet 68-2 trips its related latch 67 of Fig. 1 and causes closure of the punch interposer contacts 76 which thereupon, complete a circuit from the line 94 through the contacts 76, an isolation rectifier 98 and the 99b contacts of a relay R99 to the grid of a tube T1, thus rendering the latter conductive to energize escape magnet 53 through the normally closed cam contacts 93. The energization of escape magnet 53 causes the cards to be advanced one column in the manner previously explained and, through closure of its associated contacts 53a, completes a circuit from the line 94 through contacts 53a to the grid of a tube T2, which is thereby rendered conductive to energize relay 99 through the cam contact 93. The energization of relay 99 causes its associated 99a contacts to close and its 99b contacts to open. The opening of the 99b contacts in the grid circuit of tube T1 renders the latter non-conductive thereby rapidly deenergizing the escape magnet 53 so that it is effective for only a single column advance of the records.

The closing of the 99a contacts completes a circuit from line 94 to the grid of a tube T3, thereby rendering the latter conductive to energize the punch clutch magnet 86 through cam contact 93. With the punch lever 65 of Fig. 1 associated with the 2 index position punch now coupled to bail 72, the energization of the punch clutch magnet 86 effects a single revolution of the shaft 78 in the manner previously explained. The single revolution of the shaft 78 causes a perforation to be made at index point 2 of column 3 of the record card. During the revolution of shaft 78, associated cam actuated contacts 93 open to break the circuits through relay 99 and the punch clutch magnet 86. A further circuit is completed upon closure of punch interposer contacts 76, this circuit extending from line 94 through the contacts 76, and through the normally closed side of contacts 96-K to the grid of a tube T4 to render it conductive for the energization of the keyboard restoring magnet 25 so that the keyboard is restored and contacts 23-2 reopen while punching is taking place.

The foregoing explains briefly the normal punching operation that takes place, it being particularly noted that the column to be punched is normally out of punching position and that an escapement action takes place prior to the actual punching so that, after the perforation has been effected, the punched column remains in line with the punches.

To obtain a punching at the zero point in the next column (column 4), the zero key is operated to effect a closing of the associated 23-0 contacts. With these contacts closed, the 0 interposer magnet 68 is energized and, as a result thereof, the 0 index point of column 4 of the record is perforated in the same manner as explained for the 2 punching operation. Thereafter, the 7 and 1 keys are operated in a similar manner to effect a seven perforation in column 5 and a 1 perforation in column 6 of the record card. The cards are then advanced to a position where column 11 of the program card is in a sensing position and the corresponding column 11 of the record card C is one space from the line of punches 36. For the example of Fig. 10, it is assumed that the amount to be punched in this 7 column field contains seven digits so that there are no zeros to be filled in to the left, and the operations taking place under these circumstances will now be explained.

With column 11 of the program card in sensing position, the star wheel contacts PC7, PC8, and PC9 of Fig. 8a are closed and cause energization of relay magnets designated R7, R8, and R9 thus closing their related contacts designated 9a to 9j for relay R9, 8c to 8f for relay R8, and 7a to 7c for relay R7. With either of the paralleled R9b or R8b contacts closed, a circuit is completed from the power line 94 through the 104a contacts (normal) of a relay R104, the 103b contacts (normal) of a relay 103, either the R8b or R9b contact points and the so-called keyboard disconnect relay R96 to the power line 97. With relay 96 energized, all of its related contact points 96a to 96k are shifted. Relay 96 is held energized through its own 96a contact point and the keyboard restore contact 25a. It will be noted that energization of either of the relays R8 or R9 will bring about energization of relay 96.

With column 11 of the program card in sensing position and with relays R7, R8, R9, and R96 being energized as explained above, the operator, in accordance with the rules set forth hereinabove, will depress a key representing the number of places of the amount to be punched. For the example chosen, this will be the 7 key which upon depression will cause closure of the contacts 23-7 in the usual fashion. Since at this time relay R96 is energized, its contacts 96d are shifted so that there is no circuit completed to the corresponding interposer magnet 68-7. A circuit is completed, however, from the line 94 through the keyboard restore contacts 25a, the 23-7 contacts, the contacts PCP-3 (normal), the contacts 96d (shifted), the contacts 9d (shifted), the contacts 8c (shifted), the contacts 7b (shifted), through a conductor 102 and the pick-up coil of a so-called stop relay R103 to the power line 97. The energization of the stop relay R103 causes its associated R103a contacts to close and its R103b contacts to transfer. The transferring of the R103b contacts opens the circuit through the relay 96 and completes a circuit from the power line 94 through the normally closed side of contacts R104-a, the normally open side of contacts R103b, now closed, through a conductor 105, the R96k contacts (shifted), to the grid of tube T4 thus rendering the latter conductive to energize the keyboard restore magnet 25 and restore (open) the 23-7 contacts. When the keyboard restore magnet 25 is fully energized, its associated 25a contacts open and break the hold circuit to relay R96. Upon the deenergization of relay R96, its associated R96a to R96k contacts shift, thus opening the grid circuit to tube T4 and causing the latter to be rendered non-conductive again. With tube T4 non-conductive, the keyboard restore magnet 25 is deenergized to close the keyboard restore contacts 25a and reconnect the commoned side of the contacts 23-0 to 9 to the power line 94. The stop relay R103 is held energized through the associated R103a contacts and the normally closed R104b contacts of stop clear relay R104.

The operator now depresses the keys of the amount to be punched in this field of the record card, the first of these being the 3 key resulting in the closure of the contacts 23-3. With the closure of the contacts 23-3, a circuit is completed from line 94 through the contacts 25a, contacts 23-3, contacts PCP-2 (normal), contacts 96c (normal), interposer magnet 68-3 and the R96b contacts (normal) to the line 97. As a result, the record card is spaced and then punched at the 3 index point position of column 11 in the manner previously explained. Thereafter, the 4, 5, 6, 7, 8, and 9 keys are operated successively to punch the desired perforations in the remaining columns as shown in Fig. 10. The program card is, of course, advancing through columns to permit a reading of the 7, 8 and 9 perforated positions but, since the stop relay R103 is being held energized and its R103b contacts are transferred, the completed sensing of an 8 or 9 perforation in the program card cannot effect the energization of relay R96. When the last column (17) of the field in the program card reaches sensing position, a 7 perforation alone is sensed in the program card and, as a result, only the relay R7 of the program relays is energized. With the relay R7 energized, the closing of a contact 107 by a cam carried by the shaft 78 completes a circuit from the power line 94 through the normally closed R9a contacts, the normally closed R8a contacts, the normally open contacts R7a (now closed) and the stop clear relay R104 to the power line 97. The energization of relay R104 causes its normally closed R104b contacts to open and its R104a contacts to transfer. The opening of the R104b contacts opens the hold circuit to the stop relay R103 to deenergize the latter. With the stop relay 103 deenergized and its R103b contacts in normal position, the pick up circuit to relay 96 is again available when an 8 or 9 index perforation in the program card is sensed. The rectifier shunted around the stop clear relay R104 delays the deenergization of relay R104 upon the opening of the R7a contacts until the stop relay 103 has been positively deenergized. The machine is now in condition for the next amount to be punched in the record card.

The record card is now advanced by the conventional spacing devices (not shown) to a position where column 23 of the program card is in a sensing position and the corresponding column 23 of the record card C is one space from the line of punches 36. As a result of the sensing of the 8 and 9 perforation in column 23 of the program card with its resultant energization of relays R8 and R9, the relay R96 is again energized. Since a 3-place numerical amount is to be punched in this field, the operator will first depress the 3 key to close the contacts 23-3. This results in the completion of a circuit from line 94 through contacts 25a, contacts 23-3, the contacts PCP-2 (normal), through the contacts R96c (shifted), the contacts R9c (shifted), conductor 108, the isolation rectifier 109 and the interposer magnet 68-0 to the line 97. The zero magnet 68 trips its punch latch 67 to close contacts 76 as before, resulting in the operation of the escapement magnet 53 and the punch clutch magnet 86 so that the record card C is stepped one column and a zero is punched in column 23. However, this action is not accompanied by the energization of the keyboard restore magnet 25 because the contacts R96k in Fig. 8a are shifted so that no current is applied to the grid of tube T4 from line 94. As a result, the contacts 23-3 remain closed and the circuit through the zero interposer magnet 68 remains in a completed state to effect an automatically repeated operation of the escape and punch mechanism to punch zeros in columns 24, 25 and 26.

In column 27 of this field of the program card, the punching occurs in the 7 and 8 positions, and this column is in reading position while zero punching is taking place in column 26 of the record card C. Consequently, with relays R7 and R8 now energized, there is an additional circuit traceable from power line 94 through contacts 25a, contacts 23-3, the contacts PCP-2 (normal), the shifted R96c contacts, the normally closed side of contacts R9c, the shifted R8c contacts, the shifted R7b contacts, conductor 102 and the pick-up coil of the stop relay R103 to the power line 97. The relay R103 holds through its own R103a contacts and the normally closed R104b contacts. With relay R103 energized, its R103b contacts in transferring complete a circuit from the power line 94 through the normally closed side of the R104a contacts, the R103b contacts (shifted), the conductor 105, the normally open side of contacts R96k (still shifted), to the grid of tube T4 thus rendering the latter conductive to energize the keyboard restore magnet 25. Accordingly, as an accompaniment to the zero punching in column 26, there is the energization of the keyboard restore magnet 25, so that the contacts 23-3 reopen after column 26 has been punched. Also, as a result of the energization of the magnet 25, the keyboard restore contacts 25a open and break the hold circuit to relay R96. With relay 96 deenergized, its associated contact points R96a to R96k restore to normal. As the R96k contacts transfer, the circuit to the grid of tube T4 is broken thus rendering it non-conductive to deenergize the keyboard restore magnet 25. The keyboard restore contacts 25a then close to reconnect the keyboard to the power line 94. As a result of the above actions, punching operations are again under the control of manual keyboard operation.

The operator thereafter depresses the keys 5, 6, and 7 in sequence to effect punching of this amount in columns 27, 28, and 29 of the record card C in the conventional manner. As explained previously in detail in regard to the preceding seven column field, the single 7 perforation in column 29 of the program card effects the energization of the stop clear relay R104. The energization of the stop clear relay R104 drops out the stop relay R103 so that the machine is in condition for punching of the next field in the record card, card C. Inspection of Figs. 8 and 8a will show that the R9c to R9j contacts, the R8c to R8f contacts, and the R7b and R7c contacts are electrically interconnected in such a manner that they permit a current path to the stop relay R103 when their adjustment under control of a column of the program card corresponds to the digital value of the key operated. Thus, in the example previously traced, the circuit is completed through these contacts only when they are set to represent the perforations in the third column from the right in the program card (that is 7 and 8 perforations) and the 3 key is operated. In the same manner, if the 5 key had been operated, the circuit to the stop magnet R103 would be completed only when the 7 and 9 relays had been energized in response to sensing of these perforations in the fifth column from the right in that field of the program card.

After the 29th column of the record is perforated to represent a 7 in the example of Fig. 10, the card is spaced by the conventional spacing devices (not shown) to a position where column 35 of the program card is in a sensing position and the corresponding column 35 of the record card C is one space from the line of punches 36. It will be noted that this field in the program card contains five columns and column 35 accordingly contains a 7 and 9 perforation. Consequently, relays R7 and R9 are energized to condition their contacts so that only the operation of the 5 key results in energization of the stop relay R103. For the example shown in Fig. 10, the operator depresses the two key. This effects completion of a circuit from the power line 94 through contact 25a, the contacts 23-2, the contacts PCP-4 (normal), the contacts R96e (shifted), contacts R9e (shifted), conductor 108, through rectifier 109 and the interposer magnet 68-0 to the power line 97. This results in the escapement of column 35 of the record card to the punching line and perforation of the zero index point in such column followed by similar automatic zero punching in columns 36 and 37.

While column 37 is being punched, column 38 of the program card is being read to energize relay R8 thus completing a circuit at this time from line 94 through contact 25a, the 23-2 contact (still closed), the PCP-4 contacts (normal), the R96e contacts (shifted), the R9e contacts (normal), the R8d contacts (shifted), the R7c contacts (normal), the conductor 102 and the stop magnet R103 to the power line 97, thus interrupting zero punching and restoring the keyboard so that the operator may thereafter manually key the value 34.

After the value 34 has been entered into columns 38 and 39 of the record card C, the card is advanced in the conventional manner until column 47 of the program card is in a sensing position and the corresponding column 47 of the record card C is one space from the line of punches 36. As a result of the sensing of the 9 perforation in column 47 of the program card with its resultant energization of relay R9, the relay R96 is again energized. In the example shown in Figs. 9 and 10, it is desired to fill this field with zeros (no significant digits). The operator accordingly depresses the 0 key thus closing the associated 23–0 contacts. With contacts 23–0 closed, a circuit is available from the power line 94 through contacts 25a, contacts 23–0, contacts R96j (shifted), contacts R9j (shifted), rectifier 109 and the interposer magnet 68–0 to the power line 97. The magnet 68–0 trips its punch latch 67 to close contacts 76 as before and effect an operation of the escapement magnet 53 and the punch clutch magnet 86 so that the record card C is stepped one column and a zero punched in column 47. This action is not accompanied by the energization of the keyboard restore magnet 25 because the contacts R96k in Fig. 8a are shifted so that no current is applied to the grid of tube T4 from line 94.

As a result of the escapement and punching action described above, column 48 of the program card is advanced into sensing position. This column contains perforations at the 7 and 8 index point positions to provide an energization of relays R7 and R8. With these two relays energized, a circuit is available from the power line 94 through keyboard restore contact 25a, the 23–0 contacts (still closed), the R96j contacts (shifted), the R9j contacts (normal), the R8f contacts (shifted), conductor 108, rectifier 109 and the interposer magnet 68–0 to the power line 97. The magnet 68–0 again trips its punch latch 67 to close contacts 76 as before, resulting in the operation of the escapement magnet 53 and the punch clutch magnet 86. Thus, the record card and program card are advanced one column and a zero punched in column 48 of the record card.

By the escapement and punching action just described, column 49 of the program card is advanced into sensing position, and the sensing of the 8 perforation therein results in the energization of relay R8. This provides a circuit from the power line 94 through keyboard contact 25a, the 23–0 contacts (still closed), the R96j contacts (shifted), the R9j contacts (normal), the R8f contacts (shifted), the conductor 108, rectifier 109 and the interposer magnet 68–0 to the power line 97. The magnet 68–0 trips its punch latch 67 to close contacts 76 as before, resulting in the operation of the escapement magnet 53 and the punch clutch magnet 86. Thus, the record card and program card are advanced one column and a zero is punched in column 49 of the record card.

With column 50 of the program card now in sensing position, the sensing of the 7 perforation therein results in the energization of relay R7. As a result, a circuit is available from the power line 94 through contacts 25a, the 23–0 contacts (still closed), the R96j contacts (shifted), the R9j contacts (normal), the R8f contacts (normal), the R7c contacts (shifted), conductor 108, rectifier 109 and interposer magnet 68–0 to the power line 97. The magnet 68–0 again trips its punch latch 67 to close contacts 76 as before, resulting in the operation of the escapement magnet 53 and the punch clutch magnet 86. Thus, the record card and program card are advanced one column and a zero is punched in column 50 of the record card C. During the punching action and before the relay R7 is deenergized, cam contact 107 closes to complete a circuit from the power line 94 through cam contact 107, the R9a contacts (normal), the R8a contacts (normal), the R7a contacts shifted and the stop clear relay R104 to the power line 97. The transferring of the R104a contacts, completes a circuit from the power line 94 through contacts R104a (shifted), conductor 105, the R96k contacts (still shifted) to the grid of T4, thus rendering the latter conductive to energize the keyboard restore magnet 25. This causes an opening of the associated contacts 25a to break the hold circuit to relay R96 so that the latter is deenergized. Upon the deenergization of relay R96, its contacts R96k shift to break the grid circuit of tube T4 thus rendering it non-conductive so as to deenergize the keyboard restore magnet 25. With magnet 25 deenergized, the associated contacts 25a close so that the machine is again under control of the manual keyboard.

*Program card preparation*

As explained previously, the automatic punching of zeros is dependent upon the code punching in the program card. In order to simplify the preparation of the program cards, the machine has been so arranged that the operator does not need to know the program card code punching, but need only depress the numeric keys in descending order sequence, the first key depressed being dependent upon the size of the field desired. For example, in preparing the program punching for the program card C of Fig. 9, the operator first closes the program card prepare switch 113 in Fig. 8a. As a result, a circuit is completed from the power line 94 through the switch 113 and the PCP relay to the power line 97. The energization of this relay causes its associated PCP–1 contacts to close and the PCP–2 to 8 contacts to transfer. The transferring of the PCP–2 to 8 contacts disconnects the related key contacts 23–1 to 23–7 from their regular circuits and connects them to the rectifier translating network 114 shown in Fig. 8a.

The operator then advances a blank record by the usual feed and spacing means until line 11 thereof is one column to the right of the punching line 36. Thereafter, since the first field of the program card is to be a 7 column field, the operator in accordance with the rule previously stated, depresses the 7, 6, 5, 4, 3, 2 and 1 keys in descending order sequence. The operation of the 7 key closes the 23–7 contacts in the usual manner to complete a circuit from the power line 94 through contacts 25–1, the 23–7 contacts, the PCP–3 contacts (shifted), the isolation rectifier 115, the interposer magnet 68–7, the R96b contacts (normal) to the power line 97. Simultaneous therewith, a circuit is completed through rectifier 116 and conductor 118 to energize the interposer magnet 68–8. A similar circuit is completed through rectifier 119 and conductor 120 to energize the interposer magnet 68–9. Thus, as a result of the depression of the 7 key, the 7, 8, and 9 interposer magnets 68 are energized to effect perforation of the 7, 8 and 9 index points of column 11 of the record in the conventional manner. This is the required program code punching for column 11 of the card as will be noted in Fig. 9. During the punching operation in column 11, a cam carried by the shaft 78 closes a contact 122 to complete a circuit from the power line 94 through contact 122, the R123c contacts (normal) of a so-called "12" punch stop relay R123, the PCP–1 contacts (now closed), the pick-up coil of a "12" punch relay R124 to the power line 97. The resultant energization of relay R124 causes its contacts R124a to close and its contacts R124b to transfer. The closing of the contacts R124a completes a hold circuit for relay R124 from the power line 94 through a contact 125 which is closed by a cam carried by the program drum shaft 55, the contacts R123d (normal), the contacts R124a (now closed), through the hold coil of relay R124, to the power line 97. Relay R124 is held energized until the beginning of the punch interval of the next machine cycle wherein it is again energized in the manner explained above.

The depression of the 6 key by the operator completes a circuit to the interposer magnets 68–8 and 68–9 to effect a perforation in the related index points of column 12 as required. At the same time that the 8 and 9 interposer magnets are energized through the PCP–5 contacts (transferred) and the closed contacts 23–6, a parallel circuit is completed through either conductor 118 or 120, the associated rectifier 127 or 128 respectively, conductor 129, the R124b contacts (shifted) and the interposer magnet 68–12 to the power line 97. Thus, the 12 index point position of column 12 of the program card in preparation is also perforated. This 12 perforation is required for other operations, such as skipping, which are fully explained in the prior mentioned patent application.

Thereafter, the depression of the 5 key effects the perforation of the 9, 7, and 12 index points of column 13 of the card in a similar manner. The depression of the 4, 3, and 2 keys in descending order effects the perforation of columns 14, 15, and 16 as indicated in Fig. 9. Thereafter, the depression of the 1 key completes a circuit from the power line 94 through contacts 25a, contacts 23–1, through contacts PCP–6 (shifted), conductor 130 and the pick-up coil of relay 123 to the power line 97. The resultant energization of relay 123 causes its associated contacts R123a to R123e to shift. The closing of the contacts R123e completes a circuit from the power line 94 through contacts 25a, contacts 23–1, contacts PCP–6 (shifted), conductor 130, conductor 132, the R123e contacts (now closed), conductor 133, conductor 134, the interposer magnet 68–7 and the contacts R95b to the power line 97. At the same time a circuit is completed from conductor 134 through rectifier 136, conductor 129, the contacts R123a (shifted), the contacts R124b (normal) and the interposer magnet 68–12 to the power line 97. With the 7 and 12 interposer magnets energized, a 12 and 7 is punched in column 17 of the record as required.

The closing of the contacts R123b completes a circuit from the power line 94 through cam contacts 131 (when closed), the contacts R123B and the hold coil of relay R123 to the power line 97. Relay R123 is held energized through the above circuit until the contacts 131 are opened by the next escapement operation. The opening of the contacts R123d deenergizes relay R124, which, it will be remembered, controls 12 punching, so that the 12 perforation is omitted in the highest order column (column 23) of the next field in the same manner as in column 11. Skipping operations, etc., require that the highest order column of each field in the program card does not contain a 12 perforation while a 12 perforation is required in the succeeding lower order column as indicated in Fig. 9.

Upon completion of the punching in column 17 of the record, the operator advances the record until column 23 thereof is one column to the right of the punching line. Since the next field in the program card is to be a seven column field, the operator accordingly depresses the 7 to 1 keys successively in descending order, thus effecting a perforation of columns 23 to 29 inclusive as indicated in Fig. 9. Thereafter, the remaining 5 and 4 column program fields are prepared in a similar manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a perforating machine, a row of digit representing punches, means for advancing a record card past said row of punches column by column, said record card having a field comprising a predetermined number of columns in which digit representing perforations may be made, a set of digit representing keys, a programming device having controlling data arranged in a field comprising a number of columns equal to said record card field, and an analyzing circuit controlled jointly by said programming device and any of the keys whose digital value is less than the number of columns in said program field and effective upon operation of said key, when the first column of said record field is in position to be punched for causing said punches to punch a zero in said first column and in a number of subsequent columns equal to the difference in value between the operated key and the number of columns in the program field.

2. In a perforating machine, a line of punches, means for advancing a record card past said line of punches, column by column, said card having a field comprising a predetermined number of columns, actuating devices for the punches, a set of digit representing keys, a programming device having controlling data arranged therein in a field comprising a number of columns equal to said record card field, and an analyzing circuit jointly controlled by said device and one of said keys for causing repeated actuation of the zero representing punch to punch zeros in a number of columns beginning at the left of said record field, equal in number to the difference between the number of columns in said program field and with a value of said operated key.

3. In a perforating machine, a line of punches, one for each of the digits, a plurality of keys one for each of the digits, means normally controlled by the keys for effecting operation of the punching mechanism to punch related digits, means for advancing a multicolumnar record card past said punching mechanism, circuit means controlled by said advancing means and effective when the record is in a predetermined position with respect to the punching mechanism for changing the relationship between the keys and said punching mechanism, to cause each of several of said keys when operated to control the punching mechanism to punch a different number of zeros in successive columns of the record.

4. In a perforating machine, punching mechanism for punching, column by column, in a multi-column field of a record card, a set of digit representing keys, a program device having controlling data arranged therein in a field comprising a number of columns equal to said record card field, said keys being operated by first actuating the key representing the number of places in the value to be punched, and then actuating the keys in accordance with the digits of the value, and circuit means controlled by the programming device in response to said first key actuation for causing punching of zeros in all columns of the record field to the left of the columns in which the value is to be punched, subsequent actuation of the keys causing punching of the value in the remaining columns of the record field.

5. In a machine for effecting data representative perforations in columns of a multicolumnar field of a record card, punching mechanism, means for advancing the record card past punching mechanism to present the columns of the field thereto for successive punching therein of digital values, a set of digit representing keys, a program device, circuit means jointly controlled by said device and said keys when any of several of said keys is operated and when a predetermined card column is at the punching mechanism for initiating and effecting punching of zeros in a succession of said columns, there being a different number of zeros punched for each of said several keys.

6. In a machine for effecting the recording of data representations in succeeding columns of a multicolumnar field of a record card, a recording device, means for advancing the record past said recording device to present the columns of the field thereto for successive recording therein of digital values, a set of digit representing keys, a program device, analyzing means jointly controlled by said device and said keys when any one of several of the keys is operated and when a predetermined card column is at the recording device for initiating and effecting the recording of a predetermined designation in a succession of said columns, there being a different number of designations recorded for each of said several keys.

7. A perforating machine comprising, a line of digit representing punch devices, a line of sense devices, means for advancing a record card past said line of punch devices, column by column, said record card having a field comprising a predetermined number of columns in which digit representing perforations may be made, means for concurrently advancing a program record, column by column, past said line of sense devices to present predetermined control designations thereto, a bank of digit representing keys, and an evaluating circuit means controlled jointly by said sensing devices and one of said keys for causing repeated actuation of the zero representing punch to punch zeros in a number of columns beginning at the left of said field, equal in number to the difference between the number of columns in said field and the value of said operated key.

8. A perforating machine comprising, in combination, a line of digit representing punches, means for advancing a record card past said line of punches column by column, said record card having a field comprising a predetermined number of columns in which digit representing perforations may be made, a control magnet for each of said punches, a bank of keys, one for each of said magnets and adapted when actuated to impulse said associated magnet to effect an operation of said related punch, a program device, and an evaluating network controlled by said program device for temporarily disconnecting each of several of said keys from said associated control magnet and connecting it and a portion of said network to the zero digit control magnet when the first column of the field is in position to be punched for causing each of said keys when actuated to punch a different number of zeros in the record.

9. A perforating machine comprising, in combination, a line of digit representing digit punches, a control magnet for each of said punches, a key actuated contact for each of said magnets and normally adapted when closed to energize said associated magnet to effect an operation of said related punch, a program device, an analyzing network controlled by said program device, means for advancing a record card past said line of punches column by column, said record card having a field comprising a predetermined number of columns in which digit representing perforations may be made, means controlled by said analyzing circuit and actuated when the first column of a field is in a position to be punched for temporarily disconnecting each of several of said key contacts from said associate control magnet and interposing a portion of said network between said contacts and the zero digit control magnet, wherein an actuation of any one of said keys effects an operation of the zero digit control magnet a number of times as determined jointly by the analyzing network and a digital value of said key.

10. A perforating machine comprising, in combination, a line of digit representing punches, a control magnet for each of said punches, a bank of keys, one for each of the digits, a latch type contact associated with said keys and normally latched closed by an actuation of the related key to effect an operation of the corresponding digit magnet, means for normally unlatching each of said latch contacts after a single operation of the related digit punch, means for advancing a record card past said punches to present succeeding columns of a multicolumnar field of said record card and thereto for successive recording therein of digital values, a program device, means controlled by said program device when the first column of the record field is in a position to be punched for temporarily disconnecting each of said key contacts from said associated control magnet and connecting it to the zero digit control magnet, and means controlled jointly by said program means and one of said key contacts when latched closed for delaying the normal operation of said unlatching means for a predetermined interval wherein a corresponding number of operations of the zero digit magnet is effected.

11. In a perforating machine, punching mechanism, means for advancing a record card past said punching mechanism, said card having a field comprising a predetermined number of columns in which digit representing perforations may be made, a set of digit representing keys, a program device having controlling data arranged therein in a field comprising a number of columns equal to said record card field, and an evaluating network rendered operative when the first column of said record field is in punching position and jointly controlled by said program device and any one of said keys having a digital value equal to or less than the total number of columns in said program field less 1, for causing repeated action of the zero representing punch to punch zeros in a number of columns beginning at the left of said record field, equal in number to the difference between the number of columns in said program field and the digital value of said operated key.

12. A perforating machine comprising, in combination, a row of digit representing punches, means for advancing a record card past said row of punches to present successive columns of a multicolumnar field thereto in which digit representing perforations may be made, a keyboard having a plurality of digit representing keys, one for each of said punch devices and normally adapted when operated to effect an actuation of said related punch device, a program device having controlling data arranged therein in a field comprising a number of columns equal to said record field, means controlled jointly by said program device and any of the keys whose digital value is less than the number of columns in said program field and effective upon operation of said key when the first column of the record field is in a position to be punched, for causing said punches to punch a zero in said first column and in a number of subsequent columns equal to the difference in value between the operated key and the number of columns in the program field, means for disabling a normal function of said keys during said zero punching, and means jointly controlled by said program device and said previously operated key for restoring the normal function of said keys after the last zero has been punched in the record card.

13. A record perforating machine comprising, in combination, a row of digit representing punches, means for advancing a record card past said row of punches to present successive columns of a field thereto in which digit representing perforations may be made, a bank of keys, one for each of said punches, means controlled by each of said keys and adapted to normally effect a single operation of said related digit punch for each key operation, a program device, integrating means controlled by said program device and adapted to be connected under certain conditions between said keys and the operating means of the zero digit punch, a relay adapted when energized to disconnect said keys from said customary punch operating means and connect said integrating means, means associated with said program device and rendered operative when the first column of said field is in a punching position for energizing said relay, means controlled jointly by said integrating means and any of the keys whose digital value is less than the number of columns in said field and effective upon operation of said key, when the first column of the field is in a position to be punched for causing said zero digit punch to punch a zero in said first column and in a number of subsequent columns equal to the difference in value between the operated key and the number of columns in the field, and means controlled jointly by said integrating means and said previously operated key for deenergizing said relay after the last zero is punched in the record card.

14. In a record perforating machine, a row of digit representing punches, a row of sense devices, means for advancing a record card past said row of punches column by column, said record card having a field comprising a predetermined number of columns in which digit representing perforations may be made, means for concurrently advancing a program record column by column past said line of sense devices to present predetermined control designations thereto, a bank of relays controlled by said sense devices, points of said relays being connected in an integrating network, a plurality of digit representing keys, one for each of said punches and normally adapted to effect a single operation of the related punch for each key operation, means controlled jointly by said integrating network and any one of said keys whose digital value is less than the number of columns in said field column, and effective when the first column of the field is in position to be punched for initiating a repeated actuation of said digit zero punch, and a current responsive device connected to said integrating network and adapted when energized to stop said repeated actuation of said zero punch, a current path being completed to said stop device when the adjustment of points of said relays under control of a column of the program card corresponds to the digital value of the key operated.

References Cited in the file of this patent
FOREIGN PATENTS 423,265  Great Britain _____ Jan. 29, 1935